United States Patent [19]

McMath et al.

[11] 3,771,566

[45] Nov. 13, 1973

[54] VAPOR RECOVERY ADAPTER

[75] Inventors: Jack A. McMath, Fort Thomas; Fred A. Wilson, Florence, both of Ky.

[73] Assignee: Dover Corporation, New York, N.Y.

[22] Filed: Sept. 25, 1972

[21] Appl. No.: 291,802

Related U.S. Application Data

[63] Continuation of Ser. No. 165,233, July 22, 1971, abandoned.

[52] U.S. Cl. .......................................... 137/625.49
[51] Int. Cl. ............................................. F16k 11/14
[58] Field of Search .............. 137/625.49, 625.42, 137/625.5, 627.5, 588, 614.18, 614.44; 141/59

[56] References Cited
UNITED STATES PATENTS

| | | | |
|---|---|---|---|
| 1,944,979 | 1/1934 | Hastings | 137/625.49 |
| 2,645,451 | 7/1953 | Gladden | 137/625.5 |
| 2,982,309 | 5/1961 | Read | 137/624.49 X |
| 3,040,765 | 6/1962 | Larkins | 137/614.14 X |
| 3,092,153 | 6/1963 | Stoyke | 137/588 X |
| 3,320,974 | 5/1967 | Nakasu et al. | 137/614.18 X |
| 3,345,860 | 10/1967 | Briggs | 137/625.49 X |
| 3,428,225 | 2/1969 | Winters et al. | 137/588 X |
| 3,430,820 | 3/1969 | Winters et al. | 137/588 X |
| 3,630,232 | 12/1971 | Hasselriis | 137/625.41 |

*Primary Examiner*—Samuel Scott
*Attorney*—John G. Schenk et al.

[57] ABSTRACT

A vapor recovery adaptor for preventing vapor escape to atmosphere under certain conditions is disclosed. The adaptor provides for the normal venting of the vapors to atmosphere under normal conditions. When it is desired to recover the vapors and prevent vapor escape to atmosphere, a coupler is attached to the adaptor. The coupler urges a piston to close off the opening to atmosphere and also open a valve subassembly to permit vapors to pass through the aperture to the coupler from which the vapors are recovered.

20 Claims, 5 Drawing Figures

Patented Nov. 13, 1973

INVENTORS
JACK A. McMATH
FRED A. WILSON

BY
Kinney & Schenk

ATTORNEYS

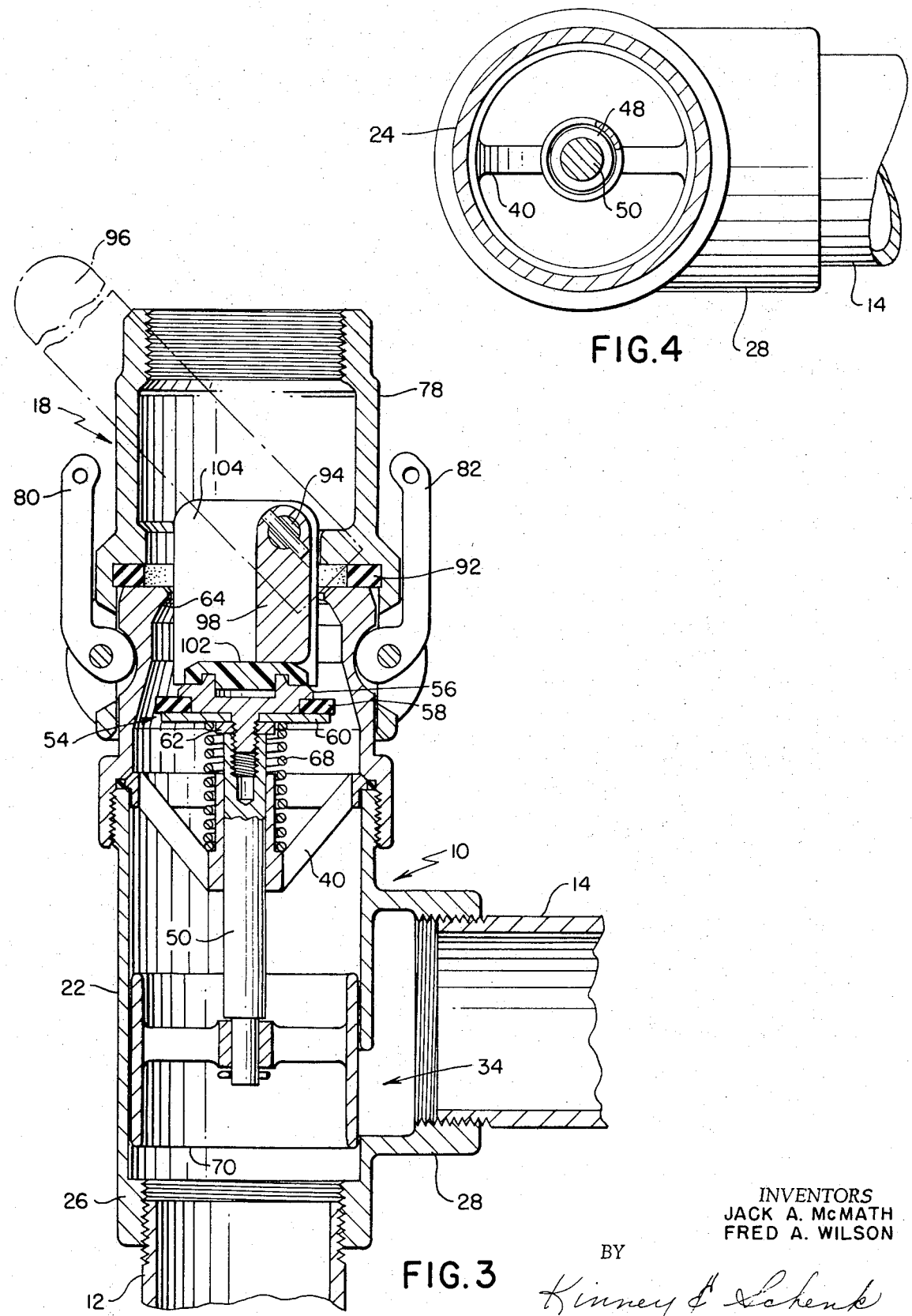

VAPOR RECOVERY ADAPTER

This is a continuation of application Ser. No. 165,233, filed July 22, 1971, now abandoned.

BACKGROUND OF THE INVENTION

This invention relates generally to valves and more particularly to a vapor recovery adaptor having a sliding piston valve therein which is mounted in a vapor line.

In underground storage tanks of volatile fluids, such as gasoline, it is necessary that the underground tanks be vented to atmosphere. In the past, each underground tank has had a separate vent line. Each separate vent line was generally placed adjacent to the outer wall of a building and extended a certain distance above the roof line to permit the vapors to exit from the vent to the atmosphere above the building height. It has become a preferred practice recently to provide a common vent line for a plurality of underground storage tanks. In this arrangement, the common vent line would likewise be vented to atmosphere above a building. Heretofore, there has been no convenient way in which to prevent the escape of the vapors to atmosphere during filling of the underground tanks. With the advent of vapor recovery systems, which prevent vapors from escaping to the atmosphere, a convenient and economical means to close off the vent line to atmosphere and recover the vapors is required.

Accordingly, it is an object of this invention to provide a vapor recovery adaptor which is attachable to a vent line so as to make the vent line usable in vapor recovery systems.

A further object of this invention is to provide a vapor recovery adaptor in a vent line which normally allows vapors to vent to atmosphere, but in the presence of a vapor recovery coupler, the adaptor closes the vent line to atmosphere and opens the vent line to the recovery system.

A still further object of this invention is to provide a vapor recovery adaptor for use in a vapor vent line which has few moving parts yet is foolproof in operation.

SUMMARY OF THE INVENTION

This invention provides a vapor recovery adaptor for mounting in a vapor vent line for preventing vapor escape to atmosphere while a vapor recovery system is attached thereto and engaged. The vapor recovery adaptor is of simple and economical construction, is foolproof in operation, and is easily accessible from the surface for maintenance if such is needed. The adaptor assembly comprises a slidable piston valve mounted within a housing. The piston valve is spring biased to a normal position in which an opening to the vent line to atmosphere is open to permit vapor passage therethrough. When a vapor recovery coupler is attached to the vapor recovery adaptor and engaged, the piston valve is urged to a second position in which the vent line to atmosphere is closed while an opening to the coupler is opened to permit passage of vapors to the adaptor, to the coupler, an thence to the vapor recovery system or receiver.

Other details, uses, and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention in which:

FIG. 3 is a cross-sectional view of the vapor recovery adaptor and coupler attached therewith in the vapor recovery condition;

FIG. 4 is a view taken on the line 4—4 of FIG. 2; and

DESCRIPTION OF ILLUSTRATED EMBODIMENT

Figures 1, 2:
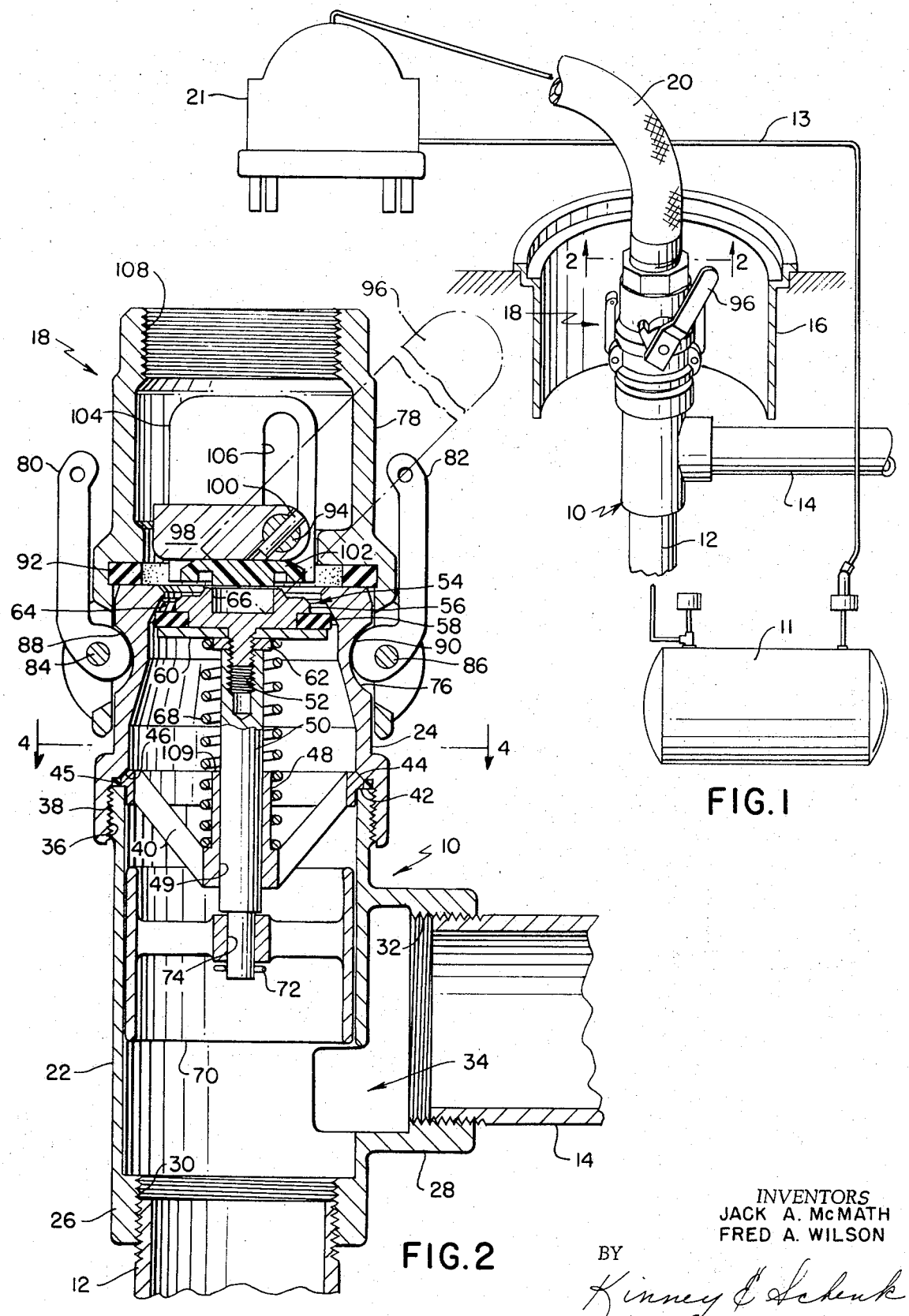
FIG. 1 is a perspective view illustrating the vapor recovery adaptor of this invention showing the typical use of the adaptor with a vapor recovery coupler and system (not to scale)
FIG. 2 is a cross-sectional view of the vapor recovery adaptor and coupler in the normal vent to atmosphere condition taken on the line 2—2 of FIG. 1.

Reference is now made to FIG. 1 of the drawings, which illustrates one exemplary embodiment of the improved vapor recovery adaptor of this invention, which is designated generally by the reference numeral 10. The vapor recovery adaptor 10 is connected to lines 12 and 14. The line 12 is the common line from one or more underground storage tanks 11. Line 14 is the continuing vapor line which vents to atmosphere. The vapor line 12 makes a substantially right angle turn underground, rises vertically and terminates at the vapor recovery adaptor 10 adjacent the ground level. The vapor recovery adaptor 10 is connected to the termination of line 12 so that it is readily accessible from the ground level through a manhole 16. In FIG. 1, the manhole cover has been removed and the vapor recovery coupler 18 is shown in place on the adaptor 10. The coupler 18 is connected with a vapor recovery line or hose 20 which is connected with a suitable vapor recovery tank truck 21.

Referring now to FIG. 2, it is seen that the vapor recovery adaptor 10 is comprised of a main housing or casing 22 and an adaptor end fitting 24. The main body 22 has an inlet port 26 and an outlet port 28. The ports 26 and 28 are internally threaded at 30 and 32 to threadably receive the vent lines 12 and 14, respectively. An aperture 34 is formed in the wall of the housing 22 so as to provide communication between ports 26 and 28 during normal conditions. The end of the housing 22 is externally threaded at 36 so as to receive the internally threaded portion 38 of the fitting 24 so as to connect 22 and 24 together.

A bridge support 40 is supported at the junction of housing 22 and fitting 24. The outer peripheral wall of the bridge 40 is formed with a shoulder 42 which engages and is supported by the end of the housing 22. The bridge is also formed with a chamfered edge 44 which cooperatively is acted on by a complementary chamfered edge 46 of the end fitting 24. Thus, when the fitting 24 is threaded onto the housing 22, the guide support 40 will be firmly held in place. The chamfered surface 44 will also tend to insure that the central guide portion 48 of the bridge support 40 will be centered within the housing 22. The central guide portion 48 is formed with a bore 49 therethrough which slidably supports a shaft 50. An O-ring 45 provides a seal between the housing 22 and end fitting 24.

The shaft 50 is internally threaded at 52 at one end thereof. The shaft 50 supports a poppet valve subassembly designated generally as 54. The poppet 54 comprises a disk holder 56 which has a portion thereof threaded so as to cooperatively engage threads 52 of shaft 50. A substantially flat disk 58 of bunan or the like is supported between the disk holder 56 and a washer 60. The spacer 62 supports the washer above the end of the shaft 50. The disk 58 provides a point contact seal with a complementary chamfered internal surface 64 formed substantially at the end of the fitting 24. The point contact between the disk 58 and surface 64 provides a seal of the fitting 24 so that no vapor can escape therethrough in the position shown in FIG. 2. The disk holder 56 is formed with a cavity or chamber 66 in the end thereof.

The poppet valve assembly 54 is normally biased to the closed position by a spring 68. One end of the spring 68 acts against the washer 60 while the other end acts against the stationary guide support 40.

A piston 70 concentric with the internal surface of the housing 22 is supported at the lower end of shaft 50 by any suitable means such as a cotter pin or the like 72. The piston is slidably movable along the inner surface of the housing 22. The central bore 74 of the piston support is slightly larger than the diameter of the shaft 50 at that portion. In this manner, the piston has a slight free floating condition so that it may center itself with respect to the housing 22. The piston 70 is normally supported above the aperture 34 by the action of the spring 68 acting on the poppet valve subassembly 54. In this condition, vapors may pass from the inlet port 26 to the outlet port 28.

The vapor recovery coupler 18 is formed of a housing 78 having an internal bore at one end of a larger dimension than the external dimension of fitting 24 to slidingly fit thereover. A pair of cam arms 80 and 82 are pivotally connected at 84 and 86, respectively, to the housing 78. The cam arms terminate at one end in camming surfaces or lugs 88 and 90. The fitting 24 is formed with an external annular groove or channel 76 to cooperatively receive the camming surfaces 88 and 90. As each camming arm 80 and 82 is pivoted outwardly and downwardly, the dimension of the camming surfaces 88 and 90 decrease so as to permit the housing 78 to be inserted and removed from the fitting 24. When the camming arms are rotated upwardly to the position shown in FIG. 2, the housing 78 is locked in place relative to the fitting 24. An annular seal or gasket 92 is supported by the housing 78. When the coupler 18 is mounted on the housing 24 and locked in place, the gasket 92 sealingly engages the end of the fitting 24.

A handle 96 (FIGS. 1 and 3) is connected externally of the housing 78 by a shaft 94 extending therethrough. The shaft 94 is supported by any suitable bearing (not shown) to permit rotation of the shaft with the rotational movement of the handle 96.

A lift arm 98 is mounted on the shaft 94 and connected therewith by pin 100. As the shaft 94 is rotated, the lift arm 98 will likewise be rotated. The arm 98 acts against a pad 102 which is complementary in form to cooperatively engage the disk holder 56. The pad 102 is held by dual plate supports 104, only one of which is shown, which are mounted on the shaft 94 by slots 106. The plate supports 104 are mounted on each side of the arm 98. The end of housing 78 is internally threaded at 108 to cooperatively receive the threaded end of a hose 20 (FIG. 1) which is connected to a tank truck or the like.

When handle 96 is rotated 90°, shaft 94 and arm 98 are likewise rotated. Arm 98 acts against pad 102 and urges it downward to the full extent and the end of arm 98 holds pad 102 in the full downward position as seen in FIG. 3. Pad 102 cooperatively engages disk holder 56 and urges it in the downward direction against the force of spring 68. Shaft 50 is likewise urged in the downward direction causing piston 70 to move downwardly to close the opening 34.

In the position shown in FIG. 3, the piston 70 has closed off opening 34 and thereby there is no communication between inlet port 26 and outlet port 28. However, due to the downward movement of the poppet valve subassembly 54, inlet port 26 is now in direct communication with the vapor recovery coupler 18 wherein vapors will pass through the vapor recovery adaptor 10 to the coupler 18 and thence to the vapor recovery system such as a tank truck or the like.

At the end of the vapor recovery operation, the handle 96 is returned to its original position which rotates the arm 98 back to the position shown in FIG. 2. This movement of arm 98 disengages the restraining force acting on the poppet valve subassembly 54 wherein spring 68 urges the poppet valve subassembly 54 upward until the seal 58 once again engages the surface 64 to close off the opening between the housing 24 and coupler housing 78. In addition, piston 70 has been raised by the shaft 50 so that the opening 34 is again clear so there is direct communication once again between inlet port 26 and outlet port 28.

For purposes of explanation of the preferred embodiment, let it be assumed that the vapor recovery adaptor 10 is connected by a common vent line 12 to any number of underground gasoline storage tanks 11 (FIG. 1). The vent line 14 connects the underground storage tanks to atmosphere. When it is time to fill any underground storage tank, the necessary gasoline fill line 13 is connected to the storage tank. At the same time, the cover (not shown) is removed from the manhole 16 in FIG. 1 and the vapor recovery coupler 18 is attached to the fitting 24. The hose 20 is connected to the gasoline tank truck 21. The handle 96 is rotated 90° to close off the opening between the inlet port 26 and outlet port 28. In this condition, there is direct communication between the underground gasoline storage tank 11 through the vapor recovery adaptor 10, vapor recovery coupler 18, hose 20 to the tank truck 21. As the gasoline from the tank truck is fed to the underground storage tank, vapor is forced out of the storage tank and is transmitted back to the gasoline tank truck. In this way, there is a mutual exchange taking place in the tank truck, i.e., vapor for fluid. When the underground storage tank has been filled, the handle 96 is rotated to its first position which once again opens communication between inlet port 26 and outlet port 28 thereby connecting the underground storage tank with the vent to atmosphere. The vapor recovery coupler 18 may then be disconnected from the fitting 24 and removed. It should be noted that line 12 may be the common vent line for any number of storage tanks.

Figure 5:
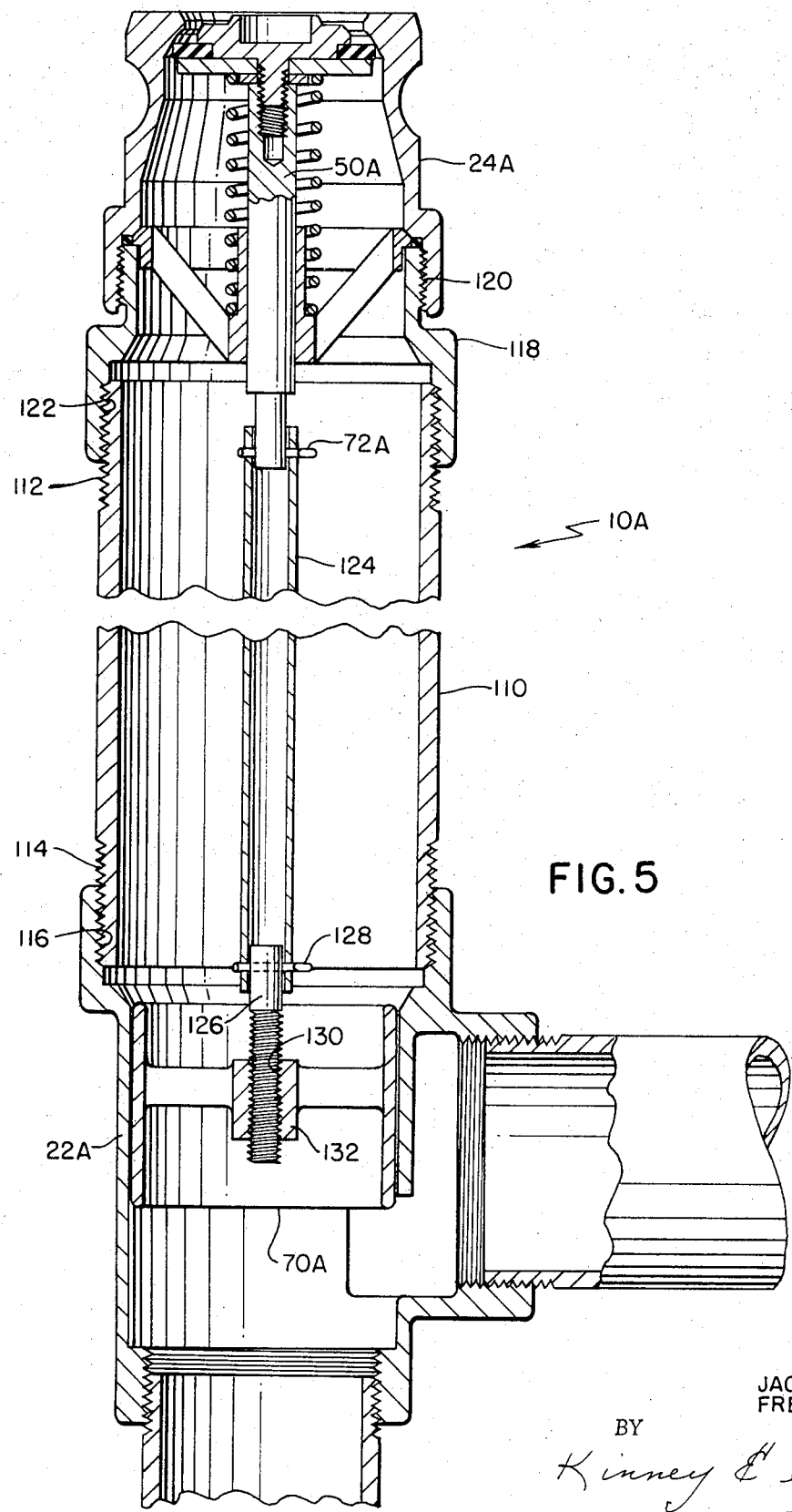
FIG. 5 is a sectional view of another exemplary embodiment of the vapor recovery adaptor of this invention and particularly illustrating an elongated adaptor assembly.

Another exemplary embodiment of this invention is illustrated in FIG. 5 of the drawings. The vapor recovery adaptor illustrated in FIG. 5 is very similar to the vapor recovery adaptor 10; therefore, such vapor recovery adaptor will be designated generally by the reference numeral 10A and parts of the vapor recovery adaptor 10A which are very similar to corresponding parts of the vapor recovery adaptor 10 will be designated by the same reference numeral as vapor recovery adaptor 10 also followed by the letter designation "A" and not described again. The main difference between the vapor recovery adaptor 10A and the vapor recovery adaptor 10 is in the vertical separation of the end fitting 24A and the housing 22A. In certain instances, the grade elevation and slope of the service station may dictate that the vapor recovery adaptor end fitting be vertically separated from the housing. In these cases, the structure of FIGS. 1 and 2 would not be suitable. Accordingly, suitable separating structure must be provided as in FIG. 5. A pipe 110 of the appropriate length is used to provide the necessary vertical separation between housing 22A and fitting 24A. The pipe 110 is externally threaded at each end 112 and 114. The housing 22A is modified to the extent that it is formed with internal threads 116 to cooperatively engage threads 114 of the pipe 110. A coupler or insert 118, appropriately threaded at 120 and 122 is used to connect the end fitting 24A to the pipe 110. A hollow tube 124 having an aperture at one end is connected to shaft 50A by pin 72A. A threaded shaft 126 is inserted in the lower end of tube 124 and connected therein by a suitable cotter pin or the like 28 extending through aligned apertures in the tube 124 and shaft 126. The piston 70A has been modified to include a threaded bore 130. The piston 70A is threadably mounted on shaft 126 and secured thereon by lock nut 132. The piston 70A may be adjusted in the vertical direction a slight amount by threading or unthreading the piston on the shaft 126. It is seen in this embodiment that the vertical separation between the housing 22A and the end fitting 24A is controlled by varying the length of the pipe 110 and tube 124. Minor vertical adjustments can be further made by threadably adjusting the piston 70A upon the shaft 126.

It can be seen that with the use of the vapor recovery adaptor of this invention, it is possible to provide a convenient means to close off the normal vent to atmosphere to readily permit the vapor to be recovered. Thus, this invention provides a vapor recovery adaptor which is of simple and economical construction and is easy to operate. Accordingly, the objectives hereinbefore set forth have been fully met.

While a present exemplary embodiment of this invention has been illustrated and described, it will be recognized that this invention may be otherwise variously embodied and practiced by those skilled in the art.

What is claimed is:

1. A vapor recovery adaptor for mounting in a line between a source of vapors and a vent to atmosphere comprising a housing having an inlet port in communication with the source of vapors and an outlet port in communication with the vent to atmosphere, said housing having an aperture providing communication between said inlet port and said outlet port; a fitting mounted relative to the end of said housing opposite the inlet port, said fitting having an outlet; a guide support mounted between said fitting and said housing; a shaft mounted for sliding movement in said guide support; means mounted at one end of said shaft for opening and closing said fitting outlet; a piston connectable with the other end of said shaft for sliding movement in said housing; resilient means normally biasing said shaft in one direction wherein said means normally engages said fitting outlet to close the outlet and wherein said piston is normally supported above said housing aperture whereby communication is established between said inlet and outlet ports to permit vapor flow therethrough to atmosphere; and said resilient means responsive to a greater bias force in the opposite direction wherein said means disengages the fitting outlet thereby opening said outlet and wherein said piston is positioned adjacent said housing aperture whereby said piston prevents communication between said inlet and outlet ports so that communication is established between said inlet port and said fitting outlet for vapor passage therethrough.

2. The adaptor according to claim 1 in which said resilient means is a spring, one end of said spring seated against said guide support and the other end thereof acting against said means.

3. The adaptor according to claim 2 in which said means is a valve assembly, said valve assembly comprising a disk holder, said disk holder having a threaded shank to threadably engage said one end of said shaft; an annular seal; a washer and a spacer wherein said annular seal is supported between said disk and washer; and said spacer supports said washer above the end of said shaft when said disk holder is threaded therein.

4. The adaptor according to claim 3 in which said fitting outlet is formed with an internal seating surface whereby said valve assembly seal engages said seating surface.

5. The adaptor according to claim 4 in which said guide support comprises a central guide element having a bore therethrough for slidably receiving said shaft, the periphery of said guide support being formed with a shoulder for cooperatively engaging a complementary shoulder for support adjacent said fitting and a chamfered surface for engaging a complementary chamfered surface on said fitting whereby said bore is concentricly located relative to said fitting.

6. The adaptor according to claim 5 in which said fitting is adapted to receive a coupler thereon, said coupler including means to urge said shaft from the normal upward position to its downward position.

7. The adaptor according to claim 6 in which said fitting is mounted on the end of said housing opposite the inlet port and in which said piston is mounted at the other end of said shaft.

8. The adaptor according to claim 6 in which said fitting is formed with an external annular groove; said coupler having an internal dimension greater than the external dimension of said fitting to slidably fit thereover and including camming means to cooperatively engage said annular groove to lock said coupler to said fitting; said coupler further including a pad supported in said coupler and adapted to engage said disk holder, a lever arm rotatably mounted in said coupler to urge said pad into engagement with said disk holder so as to urge said shaft in the downward direction; and means for rotatably moving said lever arm.

9. The adaptor according to claim 8 in which said disk holder is formed with a chamber at the end thereof, and in which said pad is complementary formed to cooperatively engage and seat in said chamber.

10. The adaptor according to claim 6 further comprising separating means for mounting said fitting in spaced relation to said housing.

11. The adaptor according to claim 10 further comprising piston support means for mounting said piston in spaced relation to the other end of said shaft wherein said piston is supported in said housing for slidable movement therein.

12. The adaptor according to claim 11 in which said separating means includes an elongated pipe connectable at one end to said housing opposite the inlet port, the other end of said pipe connectable to one end of an insert, said insert being connectable at the other end to said fitting wherein said pipe and insert establish communication between said housing and said fitting.

13. The adaptor according to claim 12 in which said piston support means includes an elongated tube connected at one end to the other end of said shaft, a shaft extension connected to the other end of said tube wherein said piston is mounted on said shaft extension.

14. The adaptor according to claim 13 in which said shaft extension is threaded, said piston having a complementary threaded bore therethrough for adjustable mounting on said shaft extension and further including a lock nut for securing said piston on said shaft extension in the adjusted position.

15. A vapor recovery adapter for mounting in a line between a source of vapors and a vent to atmosphere comprising a housing having a vapor inlet port in communication with the source of vapors, a vapor outlet port axially opposite said inlet port and a vapor outlet port in communication with the vent to atmosphere, said vapor outlet port being between said inlet port and said opposite outlet; means mounted for axial movement in said housing; closure means mounted at one end of said means for opening and closing said opposite vapor outlet; a piston connectable with the other end of said means for sliding movement in said housing; resilient means normally biasing said means in one direction wherein said closure means normally engages said opposite outlet to close the outlet and wherein said piston is normally axially displaced from said vent outlet whereby communication is established between said inlet and vent outlet ports to permit vapor flow therethrough to atmosphere; and said resilient means responsive to a greater bias force in the opposite direction wherein said closure means disengages the opposite outlet thereby opening said outlet and wherein said piston is positioned adjacent said vent outlet whereby said piston prevents communication between said inlet and vent outlet ports so that communication is established between said inlet port and said opposite outlet port for vapor passage therethrough.

16. The adapter according to claim 15 in which said means is a shaft and further comprising a guide support mounted in said housing between said inlet and opposite outlet ports, said shaft being mounted in said guide support for sliding movement therein.

17. The adaptor according to claim 16 in which said resilient means is a spring, one end of said spring seated against said guide support and the other end thereof acting against said closure means.

18. The adapter according to claim 17 in which said housing opposite port is formed with an internal seating surface and in which said closure means is a valve assembly wherein said valve assembly sealingly engages said seating surface when said valve assembly is biased in the one direction in response to said spring bias.

19. The adapter according to claim 15 further comprising a fitting mounted relative to the end of said housing opposite the inlet port, and wherein said opposite vapor outlet port is in said fitting and wherein said internal seating surface is in said fitting.

20. The adapter according to claim 19 in which said guide support is mounted between said fitting and said housing.

* * * * *